United States Patent
Ishikawa et al.

(10) Patent No.: US 9,768,891 B2
(45) Date of Patent: Sep. 19, 2017

(54) DISTORTION COMPENSATION DEVICE AND DISTORTION COMPENSATION METHOD

(71) Applicant: FUJITSU LIMITED, Kawasaki-shi, Kanagawa (JP)

(72) Inventors: Hiroyoshi Ishikawa, Kawasaki (JP); Tomoya Ota, Kawasaki (JP); Kazuo Nagatani, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/351,894

(22) Filed: Nov. 15, 2016

(65) Prior Publication Data
US 2017/0180061 A1 Jun. 22, 2017

(30) Foreign Application Priority Data
Dec. 21, 2015 (JP) .................. 2015-249072

(51) Int. Cl.
*H04B 1/62* (2006.01)
*H04B 15/00* (2006.01)
*H04W 52/52* (2009.01)

(52) U.S. Cl.
CPC ............ *H04B 15/00* (2013.01); *H04W 52/52* (2013.01)

(58) Field of Classification Search
CPC . H04B 15/00; H04B 1/02; H04B 1/04; H04B 1/62; H04B 2001/0408; H04B 2001/0425; H04B 2001/0433; H04B 2001/0441; H04B 2001/045; H04W 52/52
USPC ........................... 375/295, 296, 297
See application file for complete search history.

(56) References Cited

U.S. PATENT DOCUMENTS

| 6,724,831 B1* | 4/2004 | Hasegawa ............. H03F 1/3258 375/296 |
| 7,012,969 B2* | 3/2006 | Ode ...................... H03F 1/3247 330/149 |
| 7,663,436 B2* | 2/2010 | Takano ..................... H03F 1/30 330/149 |
| 8,509,349 B2* | 8/2013 | Nagatani ............... H03F 1/3247 375/295 |
| 2004/0232986 A1 | 11/2004 | Hirose et al. |
| 2008/0187035 A1 | 8/2008 | Nakamura et al. |

(Continued)

FOREIGN PATENT DOCUMENTS

| JP | 2008-294518 | 12/2008 |
| JP | 2011-199429 | 10/2011 |

(Continued)

*Primary Examiner* — Siu Lee
(74) *Attorney, Agent, or Firm* — Fujitsu Patent Center

(57) ABSTRACT

A distortion compensation device includes a multiplier, a subtracter, an LUT, and a distortion compensation unit. The multiplier calculates the product of amplitudes or the product of power of transmission signals at two different times or calculates the ratio of amplitudes or the ratio of power of transmission signals at two different times. The subtracter calculates the phase difference between the transmission signals at two different times. The LUT specifies a distortion compensation coefficient by using both the product or the ratio calculated by the multiplier and the phase difference calculated by the subtracter. The distortion compensation unit performs, by using the distortion compensation coefficient specified by the LUT, a predistortion process on the transmission signal that is input to the amplifier.

5 Claims, 9 Drawing Sheets

(56) References Cited

U.S. PATENT DOCUMENTS

| | | | | |
|---|---|---|---|---|
| 2011/0227643 A1* | 9/2011 | Matsubara | ............ | H03F 1/3247 330/149 |
| 2011/0298536 A1* | 12/2011 | Okazaki | ................ | H03F 1/3247 330/107 |
| 2015/0077184 A1* | 3/2015 | Oishi | .................... | H03F 1/0227 330/280 |

FOREIGN PATENT DOCUMENTS

| WO | 2004-045067 | 5/2004 |
|---|---|---|
| WO | 2007-046370 | 4/2007 |

* cited by examiner

| FIRST ADDRESS | SECOND ADDRESS | DISTORTION COMPENSATION COEFFICIENT |
|---|---|---|
| A1-1 | A2-1 | C-1 |
| A1-2 | A2-2 | C-2 |
| ⋮ | ⋮ | ⋮ |

DISTORTION COMPENSATION DEVICE AND DISTORTION COMPENSATION METHOD

CROSS-REFERENCE TO RELATED APPLICATION

This application is based upon and claims the benefit of priority of the prior Japanese Patent Application No. 2015-249072, filed on Dec. 21, 2015, the entire contents of which are incorporated herein by reference.

FIELD

The embodiments discussed herein are related to a distortion compensation device and a distortion compensation method.

BACKGROUND

A radio transmitter is provided with an amplifier that amplifies power of a transmission signal. In the radio transmitter, in general, in order to increase the power efficiency of the amplifier, the amplifier is operated in the vicinity of the saturation region of the amplifier. However, when the amplifier is operated in the vicinity of the saturation region, nonlinear distortion of the amplifier is increased. Thus, to reduce the nonlinear distortion and meet the standard, such as an adjacent channel leakage ratio (ACLR), the spectrum emission mask (SEM), or the like, the radio transmitter is provided with a distortion compensation device that compensates nonlinear distortion.

A "predistortion (hereinafter, sometimes referred to as "PD") method" is used as one of distortion compensation method that is used in the distortion compensation device. In the distortion compensation device that uses the PD method, a distortion compensation coefficient that has the inverse properties of the nonlinear distortion of the amplifier is previously multiplied by the transmission signal that is input to the amplifier. Consequently, the nonlinear distortion of the amplifier is canceled out.

Furthermore, in the amplifier with high power efficiency, it is known that a phenomenon called memory effect occurs. The memory effect is a phenomenon in which an output with respect to an input to an amplifier at a certain time is affected. In a distortion compensation method that compensates nonlinear distortion of an amplifier, there is a method that also compensates the memory effect in addition to the nonlinear distortion. With this method, in a transmission signal that has the In-phase component (hereinafter, referred to as "I component") and the Quadrature component (hereinafter, referred to as "Q component"), a distortion compensation coefficient is determined by using, for example, information on a phase difference between the vector starting from the origin in the IQ coordinate plane to the current transmission signal point and the vector starting from the origin in the IQ coordinate plane to the transmission signal point at a predetermined time before.

Furthermore, as a technology that compensates the memory effect of an amplifier, a distortion compensation method that uses the Volterra series is known. In the distortion compensation method that uses the Volterra series, for example, a transmission signal z(t) that has been subjected to distortion compensation is calculated on the basis of Equation (1) below.

$$z(t) = \sum_{k=1}^{K} \sum_{l=0}^{L} \sum_{m=0}^{M} a_{klm} x(t-l) |x(t-m)|^{k-1} \quad (1)$$

In Equation (1) above, K represents the order, L and M represent the depth of a delay, and a represents a distortion compensation coefficient read from each of the order and the delay. The distortion compensation method that uses the Volterra series is the distortion compensation method that uses information on a past transmission signal. Related-art examples are described in International Publication Pamphlet No. WO 2007/046370; International Publication Pamphlet No. WO 2004/045067; Japanese Laid-open Patent Publication No. 2008-294518.

Here, for example, as illustrated in FIG. 16, the case in which the current sample point x(t) of the transmission signal is shifted from a sample point $x_1(t-\Delta t)$ or $x_2(t-\Delta t)$ at a predetermined time before is considered. FIG. 16 is a schematic diagram illustrating the shift of sample points of a transmission signal. In the example illustrated in FIG. 16, the sample points $x_1(t-\Delta t)$ and $x_2(t-\Delta t)$ are located on the same straight line passing through the origin in the IQ coordinate plane. Thus, both the angle formed by a vector 60 of the sample point x(t) and a vector 61 of the sample point $x_1(t-\Delta t)$ and the angle formed by the vector 60 and a vector 62 of the sample point $x_2(t-\Delta t)$ are $\Delta\theta$.

In a conventional distortion compensation method, a distortion compensation coefficient is determined by using information on a phase difference between the vector of the current sample point of a transmission signal and the vector of the sample point at a predetermined time before. Thus, in the conventional distortion compensation method, for example, as illustrated in FIG. 16, the same distortion compensation coefficient is selected regarding a phase difference even if the current sample point x(t) of the transmission signal is shifted from either one of the sample point $x_1(t-\Delta t)$ at the predetermined time before and $x_2(t-\Delta t)$.

However, in the example illustrated in FIG. 16, if the sample point x(t) is shifted from $x_1(t-\Delta t)$, the amplitude of the transmission signal is increased, whereas, if the sample point x(t) is shifted from $x_2(t-\Delta t)$, the amplitude of the transmission signal is decreased. Thus, a different distortion component is included in the transmission signal between a case in which the sample point x(t) is shifted from $x_1(t-\Delta t)$ and a case in which the sample point x(t) is shifted from $x_2(t-\Delta t)$. However, in the conventional distortion compensation method, a distortion compensation coefficient considering a shift of the amplitude is not specified. Consequently, in the conventional distortion compensation method, it is difficult to improve the distortion compensation performance.

Furthermore, in the distortion compensation method that uses the Volterra series indicated by Equation (1) above, it is possible to perform the distortion compensation considering the shift of past transmission signals; however, an amount of computation is large. Thus, if the distortion compensation method that uses the Volterra series indicated by Equation (1) above is used for a radio transmitter, the size of a circuit becomes large. Thus, it is difficult to apply the distortion compensation method that uses the Volterra series to the radio transmitter reduced its size and power consumption.

SUMMARY

According to an aspect of an embodiment, a distortion compensation device includes a first calculating unit, a second calculating unit, a specifying unit, and a distortion compensation unit. The first calculating unit calculates product of amplitudes or product of power of transmission signals at two different times or calculates ratio of amplitudes or ratio of power of transmission signals at two different times. The second calculating unit calculates a phase difference between the transmission signals at the two different times. The specifying unit specifies a distortion compensation coefficient by using both the product or the ratio calculated by the first calculating unit and the phase difference calculated by the second calculating unit. The distortion compensation unit performs, by using the distortion compensation coefficient specified by the specifying unit, a predistortion process on the transmission signal that is input to an amplifier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The distortion compensation device and the distortion compensation method disclosed in the present application are not limited to the embodiments described below. Furthermore, the embodiments can be used in any appropriate combination as long as the processes do not conflict with each other.

[a] First Embodiment

Distortion Compensation Device 10

Figure 1:
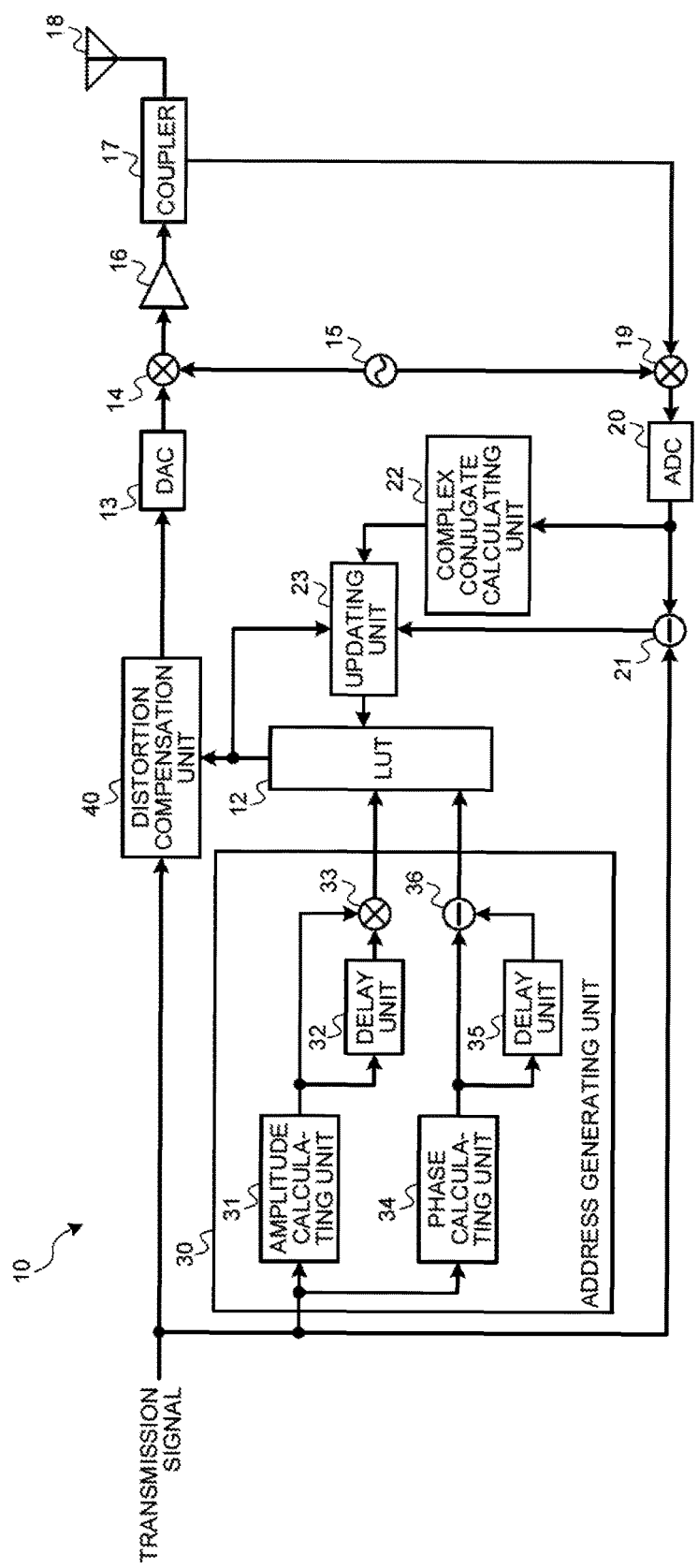
FIG. 1 is a block diagram illustrating an example of a distortion compensation device according to a first embodiment.

FIG. 1 is a block diagram illustrating an example of a distortion compensation device 10 according to a first embodiment. The distortion compensation device 10 according to the first embodiment includes a lookup table (LUT) 12, a digital-to-analog converter (DAC) 13, an up converter 14, an oscillator 15, an amplifier 16, a coupler 17, and an antenna 18. Furthermore, the distortion compensation device 10 according to the first embodiment includes a down converter 19, an analog-to-digital converter (ADC) 20, a subtracter 21, a complex conjugate calculating unit 22, an updating unit 23, an address generating unit 30, and a distortion compensation unit 40. For example, in a radio communication system that includes a base station and a terminal, the distortion compensation device 10 is mounted on the base station or the terminal or, alternatively, mounted on both the base station and the terminal.

The address generating unit 30 calculates the product of amplitudes or the product of power of transmission signals at two different times or calculates the ratio of amplitudes or the ratio of power of the transmission signals at two different times. In the first embodiment, the address generating unit 30 calculates the product of the amplitudes of the transmission signals at two different times (hereinafter, sometimes referred to as an "amplitude product"). Furthermore, the address generating unit 30 calculates a phase difference between the transmission signals at two different times.

The address generating unit 30 according to the first embodiment includes, for example, as illustrated in FIG. 1, an amplitude calculating unit 31, a delay unit 32, a multiplier 33, a phase calculating unit 34, a delay unit 35, and a subtracter 36.

The amplitude calculating unit 31 calculates the amplitude of a transmission signal at a first time and outputs the calculated amplitude to both the delay unit 32 and the multiplier 33. In the first embodiment, the first time is, for example, the current time. The amplitude calculating unit 31 calculates, as the amplitude $|x(t)|$ of the transmission signal at the first time, for example, the square root of the sum of the square of the I component and the square of the Q component of the transmission signal at the sample point $x(t)$.

The delay unit 32 delays the amplitude $|x(t)|$ of the transmission signal calculated by the amplitude calculating unit 31 by a predetermined time $\Delta t$. The multiplier 33 multiplies the amplitude $|x(t)|$ of the transmission signal calculated by the amplitude calculating unit 31 by the amplitude $|x(t-\Delta t)|$ of the transmission signal delayed by the delay unit 32 and calculates the amplitude product of $|x(t)||x(t-\Delta t)|$. Then, the multiplier 33 outputs the value of the calculated amplitude product $|x(t)||x(t-\Delta t)|$ to the LUT 12 as a first address. The multiplier 33 is an example of a first calculating unit.

The phase calculating unit 34 calculates the phase $\theta(t)$ of the transmission signal. The delay unit 35 delays the phase $\theta(t)$ of the transmission signal calculated by the phase calculating unit 34 by the predetermined time $\Delta t$. The subtracter 36 calculates a phase difference $\Delta\theta(t)$ between the phase $\theta(t)$ of the transmission signal calculated by the phase calculating unit 34 and the phase $\theta(t-\Delta t)$ of the transmission signal delayed by the delay unit 35. Then, the subtracter 36 outputs the value of the calculated phase difference $\Delta\theta(t)$ to the LUT 12 as a second address. The subtracter 36 is an example of a second calculating unit.

Figure 2:
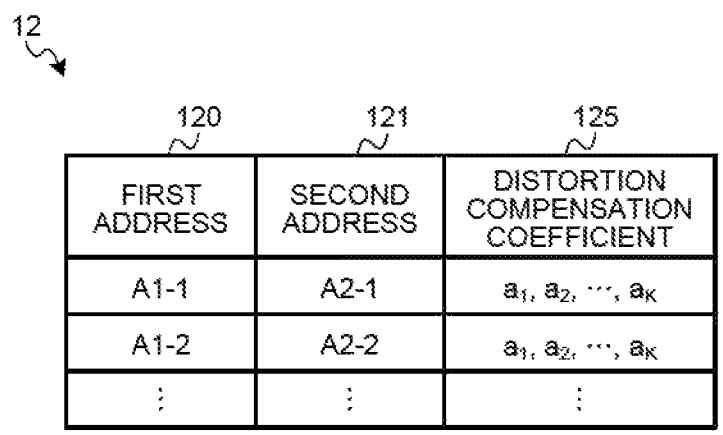
FIG. 2 is a schematic diagram illustrating an example of distortion compensation coefficients stored in an LUT according to the first embodiment.

The LUT 12 stores therein distortion compensation coefficients by associating the distortion compensation coefficients with the addresses. FIG. 2 is a schematic diagram illustrating an example of distortion compensation coefficients stored in the LUT 12 according to the first embodiment. In the LUT 12 according to the embodiment, for example, as illustrated in FIG. 2, K distortion compensation coefficients 125 are associated with first addresses 120 and second addresses 121 and are stored. When the first addresses and the second addresses are output from the address generating unit 30, the LUT 12 specifies the distortion compensation coefficients $a_1$ to $a_K$ associated with the subject addresses. Then, the LUT 12 outputs the specified distortion compensation coefficients to the distortion compensation unit 40 and the updating unit 23. The LUT 12 is an example of a specifying unit.

By using the distortion compensation coefficients $a_1$ to $a_K$ that are output from the LUT 12, the distortion compensation unit 40 performs a predistortion process on the transmission signal that is input to the amplifier 16. In a description below, the transmission signal that has been subjected to the predistortion process is referred to as a PD signal z(t). The distortion compensation unit 40 outputs the PD signal z(t) to the DAC 13.

In the embodiment, the distortion compensation unit 40 generates the PD signal z(t) by using, for example, Equation (2) below.

$$z(t) = \sum_{k=1}^{K} a_k(f(t))x(t)|x(t)|^{k-1} \qquad (2)$$

In Equation (2) above, $a_k(f(t))$ represents a $k^{th}$ distortion compensation coefficient that is determined in accordance with the value of Equation (3) below.

$$f(t)=(|x(t)||x(t-\Delta t)|,\Delta\theta(t)) \qquad (3)$$

In Equation (3) above, "$|x(t)||x(t-\Delta t)|$" represents the first address calculated by the address generating unit 30 and "$\Delta\theta(t)$" is the second address calculated by the address generating unit 30. As illustrated in FIG. 2, K compensation coefficients represented by $a_k(f(t))$ are associated with the first addresses and the second addresses and stored in the LUT 12.

In this way, the distortion compensation unit 40 according to the embodiment performs the predistortion process on a transmission signal by using a distortion compensation coefficient associated with the product of the amplitudes of transmission signals at two different times and the phase difference between the transmission signals at the subject two different times. Consequently, when the distortion compensation device 10 according to the embodiment compensates the distortion on the basis of a change in the phase of the transmission signal, the distortion compensation device 10 can use a different distortion compensation coefficient in accordance with a change in the amplitudes of the transmission signal. Thus, the distortion compensation device 10 according to the embodiment can improve the distortion compensation performance.

A description will be continued by referring back to FIG. 1. The DAC 13 converts the PD signal z(t) that has been output from the distortion compensation unit 40 from a digital signal to an analog signal. Then, the DAC 13 outputs the PD signal z(t) converted to the analog signal to the up converter 14.

The up converter 14 up converts, by using the local oscillator signal output from the oscillator 15, the PD signal z(t) that has been converted to the analog signal. A quadrature modulator, a mixer, or the like is included in the up converter 14. The up converter 14 outputs the up converted PD signal z(t) to the amplifier 16.

The amplifier 16 amplifies the power of the up converted PD signal z(t). Then, the amplifier 16 outputs, to the coupler 17, the signal in which the power has been amplified.

The coupler 17 outputs, to the antenna 18, the signal in which the power has been amplified by the amplifier 16 and feeds back a part of the signal to the down converter 19. The signal that has been output to the antenna 18 is emitted to space from the antenna 18.

The down converter 19 down converts, by using the local oscillator signal output from the oscillator 15, the signal that has been fed back from the coupler 17. A quadrature demodulator, a mixer, or the like is included in the down converter 19. The down converter 19 outputs the down converted signal to the ADC 20.

The ADC 20 converts the down converted signal from the analog signal to the digital signal. Then, the ADC 20 outputs the signal converted to the digital signal to both the subtracter 21 and the complex conjugate calculating unit 22.

The subtracter 21 calculates a difference between the transmission signal that has not been subjected to the predistortion process and the signal that has been output from the ADC 20. Then, the subtracter 21 outputs the calculated differential signal to the updating unit 23.

The complex conjugate calculating unit 22 calculates the complex conjugate of the signal output from the ADC 20. Then, the complex conjugate calculating unit 22 outputs the calculated complex conjugate signal to the updating unit 23.

The updating unit 23 calculates an updated distortion compensation coefficient on the basis of the distortion compensation coefficient output from the LUT 12, on the basis of the differential signal output from the subtracter 21, and on the basis of the complex conjugate signal output from the complex conjugate calculating unit 22. The updating unit 23 calculates the updated distortion compensation coefficient by using, for example, the algorithm, such as least mean square (LMS), recursive least squares (RLS), or the like. Then, the updating unit 23 updates the distortion compensation coefficient in the LUT 12 by using the calculated distortion compensation coefficient.

Operation of the Distortion Compensation Device 10

Figure 3:
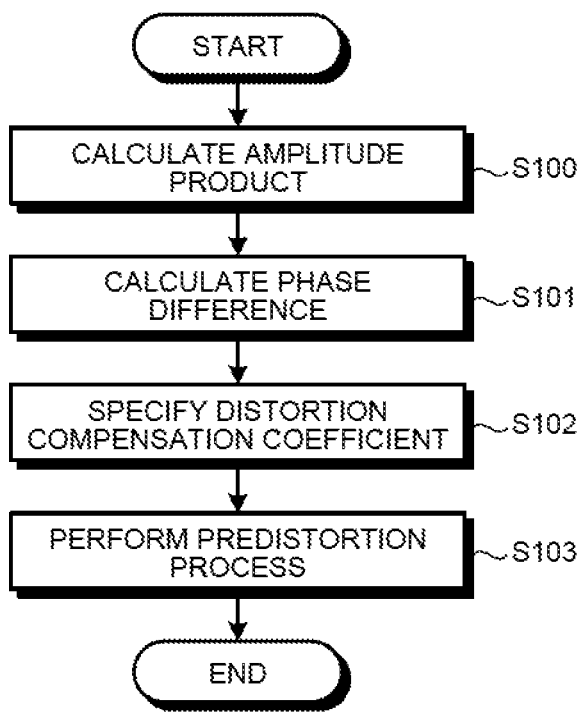
FIG. 3 is a flowchart illustrating an example of an operation of the distortion compensation device according to the first embodiment.

FIG. 3 is a flowchart illustrating an example of an operation of the distortion compensation device 10 according to the first embodiment. The distortion compensation device 10 performs the operation indicated in the flowchart at, for example, each sample timing of the transmission signal.

First, the amplitude calculating unit 31 calculates the amplitude $|x(t)|$ of the transmission signal. The delay unit 32 delays the amplitude $|x(t)|$ of the transmission signal calculated by the amplitude calculating unit 31 by the predetermined time $\Delta t$. The multiplier 33 multiplies the amplitude $|x(t)|$ of the transmission signal calculated by the amplitude calculating unit 31 by the amplitude $|x(t-\Delta t)|$ of the transmission signal delayed by the delay unit 32 and calculates the amplitude product $|x(t)||x(t-\Delta t)|$ (Step S100). Then, the multiplier 33 outputs the value of the amplitude product $|x(t)||x(t-\Delta t)|$ to the LUT 12 as the first address.

Then, the phase calculating unit 34 calculates the phase θ(t) of the transmission signal. The delay unit 35 delays the phase θ(t) of the transmission signal calculated by the phase calculating unit 34 by the predetermined time Δt. The subtracter 36 calculates the phase difference Δθ(t) between the phase θ(t) of the transmission signal calculated by the phase calculating unit 34 and the phase θ(t−Δt) of the transmission signal delayed by the delay unit 35 (Step S101). Then, the subtracter 36 outputs the value of the calculated phase difference Δθ(t) to the LUT 12 as the second address.

Then, the LUT 12 specifies the distortion compensation coefficient associated with the first address and the second address output from the address generating unit 30 (Step S102). Then, the LUT 12 outputs the specified distortion compensation coefficient to both the distortion compensation unit 40 and the updating unit 23.

Then, the distortion compensation unit 40 generates the PD signal z(t) by performing, by using both the distortion compensation coefficient output from the LUT 12 and Equation (2) above, the predistortion process on the transmission signal that is input to the amplifier 16 (Step S103). Then, the distortion compensation unit 40 outputs the generated PD signal z(t) to the DAC 13.

As is clear from the description above, in the distortion compensation device 10 according to the embodiment, the multiplier 33 calculates the product of the amplitudes of the transmission signals at two different times. Furthermore, the subtracter 36 calculates the phase difference between the transmission signals at the subject two different times. Then, the LUT 12 specifies a distortion compensation coefficient by using both the product calculated by the multiplier 33 and the phase difference calculated by the subtracter 36. Then, the distortion compensation unit 40 performs, by using the distortion compensation coefficient specified by the LUT 12, the predistortion process on the transmission signal that is input to the amplifier 16. Consequently, when the distortion compensation device 10 according to the embodiment compensates the distortion on the basis of a change in the phase of the transmission signal, the distortion compensation device 10 can use a different distortion compensation coefficient in accordance with a change in the amplitude of the transmission signal. Consequently, the distortion compensation device 10 according to the embodiment can improve the distortion compensation performance.

Furthermore, the distortion compensation device 10 according to the embodiment can reduce the distortion of the transmission signal by an amount of computation smaller than that used in a conventional distortion compensation method that uses the Volterra series. Consequently, the distortion compensation device 10 according to the embodiment can improve the distortion compensation performance by using a circuit smaller than that used in the distortion compensation method that uses the Volterra series.

[b] Second Embodiment

The distortion compensation device 10 according to a second embodiment differs from the distortion compensation coefficient stored in the LUT 12 according to the first embodiment in that the distortion compensation coefficients stored in the LUT 12 are different. Furthermore, the distortion compensation device 10 according to the second embodiment differs from the distortion compensation device 10 according to the first embodiment in that the PD signal z(t) is generated by multiplying the distortion compensation coefficient that is output from the LUT 12 by the transmission signal.

Figure 4:
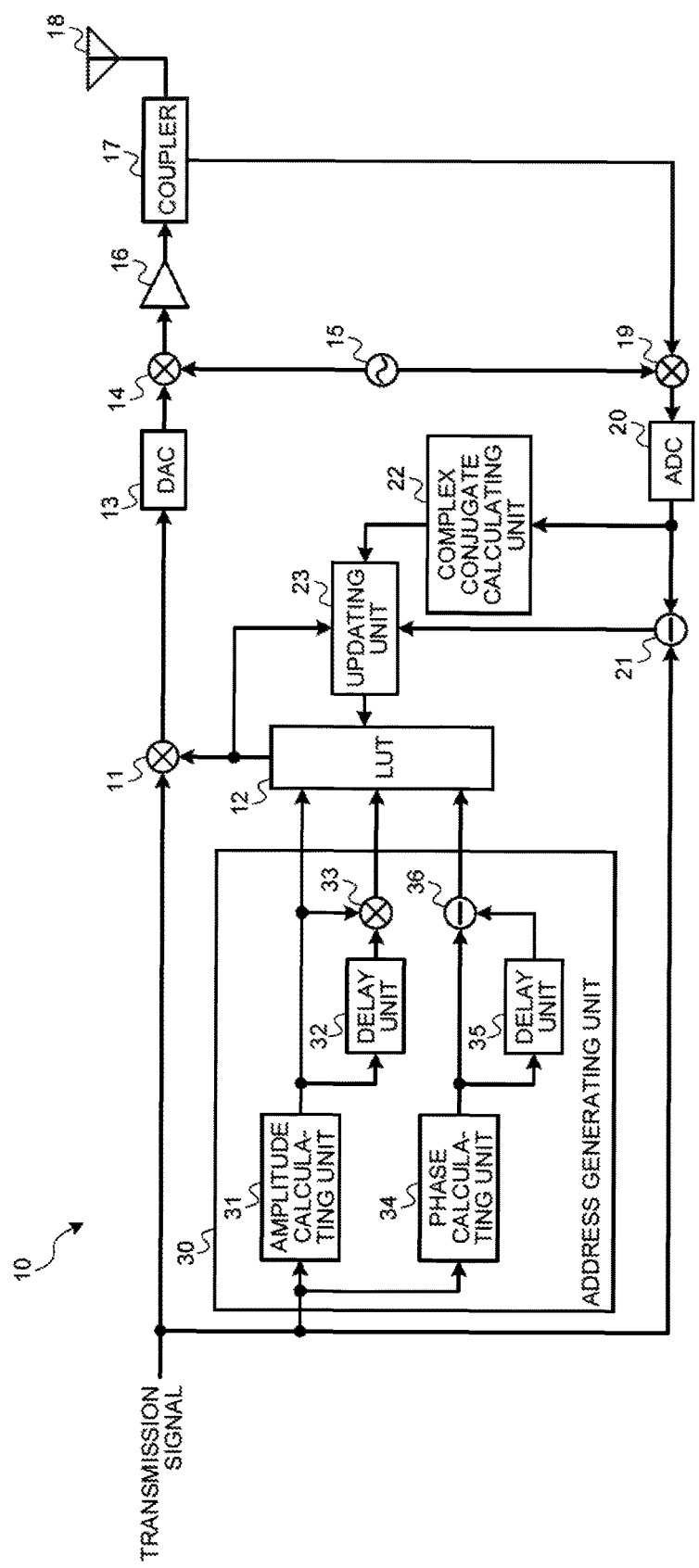
FIG. 4 is a block diagram illustrating an example of a distortion compensation device according to a second embodiment.

FIG. 4 is a block diagram illustrating an example of the distortion compensation device 10 according to a second embodiment. The distortion compensation device 10 according to the second embodiment includes a multiplier 11, the LUT 12, the DAC 13, the up converter 14, the oscillator 15, the amplifier 16, the coupler 17, and the antenna 18. Furthermore, the distortion compensation device 10 according to the second embodiment includes the down converter 19, the ADC 20, the subtracter 21, the complex conjugate calculating unit 22, the updating unit 23, and the address generating unit 30. Furthermore, the blocks illustrated in FIG. 4 having the same reference numerals as those illustrated in FIG. 1 have the same configuration as the blocks illustrated in FIG. 1 except for the following points described below; therefore, descriptions thereof will be omitted.

The amplitude calculating unit 31 calculates the amplitude |x(t)| of the transmission signal at the first time and outputs the value of the calculated amplitude |x(t)| to both the delay unit 32 and the multiplier 33. Furthermore, the amplitude calculating unit 31 outputs the value of the calculated amplitude |x(t)| to the LUT 12 as a third address.

Figure 5:
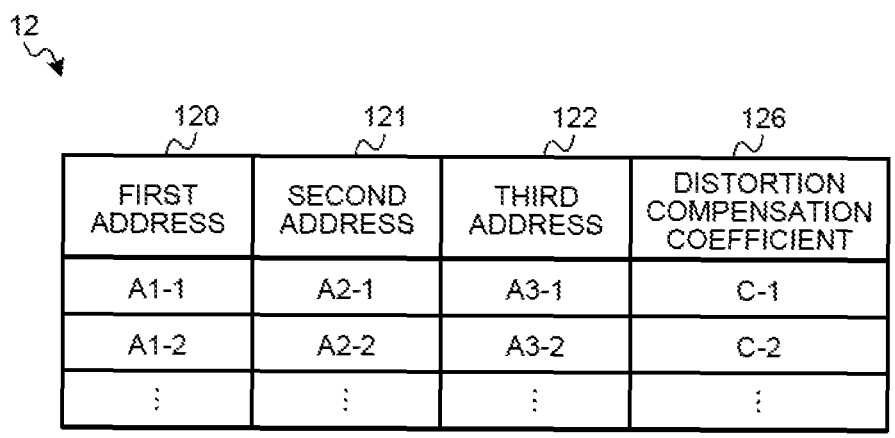
FIG. 5 is a schematic diagram illustrating an example of distortion compensation coefficients stored in an LUT according to the second embodiment.

FIG. 5 is a schematic diagram illustrating an example of distortion compensation coefficients stored in the LUT 12 according to the second embodiment. In the LUT 12 according to the embodiment, for example, as illustrated in FIG. 5, distortion compensation coefficients 126 are associated with the first addresses 120, the second addresses 121, third addresses 122 and are stored. When the first address, the second address, and the third address are output from the address generating unit 30, the LUT 12 specifies the distortion compensation coefficient associated with the subject addresses. Then, the LUT 12 outputs the specified distortion compensation coefficient to both the multiplier 11 and the updating unit 23.

Distortion compensation coefficients C that are associated with the first addresses 120, the second addresses 121, and the third addresses 122 and that are stored in the LUT 12 are represented by, for example, Equation (4) below.

$$C = \sum_{k=1}^{K} a_k(f(t))|x(t)|^{k-1} \quad (4)$$

Furthermore, the function f(t) in Equation (4) above can be represented by, for example, Equation (5) below.

$$f(t)=(|x(t)|,|x(t)||x(t-\Delta t)|,\Delta\theta(t)) \quad (5)$$

In Equation (5) above, "|x(t)||x(t−Δt)|" represents the first address calculated by the address generating unit 30 and "Δθ(t)" represents the second address calculated by the address generating unit 30. Furthermore, In Equation (5) above, "|x(t)|" represents the third address calculated by the address generating unit 30. Furthermore, in Equation (4) above, $a_k(f(t))$ represents the $k^{th}$ coefficient determined by the value of Equation (5) above.

The multiplier 11 performs, by using the distortion compensation coefficient C output from the LUT 12, the predistortion process on the transmission signal that is input to the amplifier 16. Specifically, the multiplier 11 performs the predistortion process on the transmission signal x(t) by multiplying the distortion compensation coefficient C output from the LUT 12 by the transmission signal x(t). Consequently, the multiplier 11 generates the PD signal z(t) represented by Equation (2) above.

In this way, the distortion compensation device 10 according to the second embodiment stores the distortion compensation coefficients C represented by Equations (4) and (5) above in the LUT 12 and specifies a distortion compensation coefficient on the basis of the amplitude |x(t)|, the amplitude product |x(t)||x(t−Δt)|, and the phase difference Δθ(t) of the transmission signals. Then, the distortion compensation device 10 according to the second embodiment performs the predistortion process by multiplying the specified distortion compensation coefficient C by the transmission signal. Consequently, the distortion compensation device 10 according to the second embodiment can generate the PD signal z(t) by an amount of computation smaller than that used in the distortion compensation device 10 according to the first embodiment.

[c] Third Embodiment

The distortion compensation device 10 according to a third embodiment differs from the distortion compensation device 10 according to the first embodiment in that the PD signal z(t) is generated by using the memory polynomial series. Furthermore, the overall configuration of the distortion compensation device 10 according to the third embodiment is the same as that of the distortion compensation device 10 according to the first embodiment described with reference to FIG. 1; therefore, descriptions thereof using the drawings will be omitted.

Figure 6:
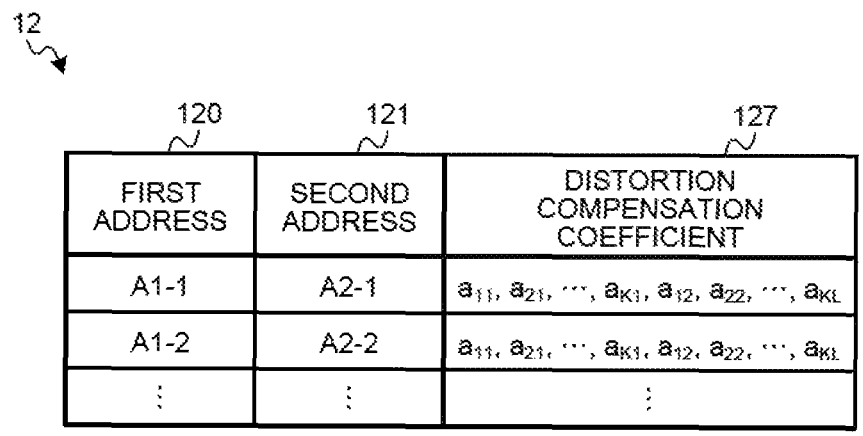
FIG. 6 is a schematic diagram illustrating an example of distortion compensation coefficients stored in an LUT according to a third embodiment.

FIG. 6 is a schematic diagram illustrating an example of distortion compensation coefficients stored in the LUT 12 according to a third embodiment. In the LUT 12 according to the third embodiment, for example, as illustrated in FIG. 6, K×L distortion compensation coefficients 127 are associated with the first addresses 120 and the second addresses 121 and are stored. Furthermore, K is a value that represents the order, L is a value that represents the depth of a delay. When the first addresses and the second addresses are output from the address generating unit 30, the LUT 12 specifies the distortion compensation coefficients $a_{11}$ to $a_{KL}$ associated with the subject addresses. Then, the LUT 12 outputs the specified distortion compensation coefficients to both the distortion compensation unit 40 and the updating unit 23.

The distortion compensation unit 40 according to the third embodiment generates, by using the distortion compensation coefficients $a_{11}$ to $a_{KL}$ output from the LUT 12, the PD signal z(t) on the basis of, for example, Equation (6) below.

$$z(t) = \sum_{k=1}^{K} \sum_{l=0}^{L} a_{kl}(f(t))x(t-l)|x(t-l)|^{k-1} \quad (6)$$

Equation (6) above is the memory polynomial series in which $a_{kl}(f(t))$ is used as the coefficient for each term. In Equation (6) above, $a_{kl}(f(t))$ represent the $k^{th}$ and the $l^{th}$ distortion compensation coefficients determined by the function f(t) indicated in Equation (3) above and are, as illustrated in FIG. 6, stored in the LUT 12 by being associated with the first addresses and the second addresses.

The function f(t) in Equation (6) above is represented by Equation (3) above and the amplitude product |x(t)||x(t−Δt)| represented in Equation (3) corresponds to the cross term of two transmission signals at different times by Δt. The cross term of the two transmission signals at different times corresponds to the term of l≠m in the Volterra series indicated by Equation (1).

In the memory polynomial series used in general, the cross term of two transmission signals at different times is not included. In contrast, in the distortion compensation device 10 according to the third embodiment, the values associated with the cross term of the two transmission signals at different times are used for the coefficients $a_{kl}(f(t))$ in the memory polynomial series. Consequently, it is possible to improve the distortion compensation performance more than that used in the conventional distortion compensation method that uses the memory polynomial series.

As described above, the LUT 12 according to the third embodiment specifies, as the distortion compensation coefficient, the coefficient of each of the terms in the memory polynomial series on the basis of the product of the amplitudes of the transmission signals at two different times and on the basis of the phase difference between the transmission signals at the two different times. Then, the distortion compensation unit 40 according to the third embodiment performs the predistortion process on the basis of the memory polynomial series by using both the distortion compensation coefficients specified by the LUT 12 and the transmission signals. Consequently, the distortion compensation device 10 can improve the distortion compensation performance more than that used in the conventional distortion compensation method that uses the memory polynomial series.

[d] Fourth Embodiment

The distortion compensation device 10 according to a fourth embodiment differs from the distortion compensation device 10 according to the first embodiment in that the distortion compensation coefficient is specified on the basis of the ratio of the amplitudes of transmission signals at two different times and a phase difference between the transmission signals at the subject two different times. Furthermore, the overall configuration of the distortion compensation device 10 according to the fourth embodiment is the same as that of the distortion compensation device 10 according to the first embodiment described with reference to FIG. 1 except for the address generating unit 30; therefore, overlapped description will be omitted.

Figure 7:
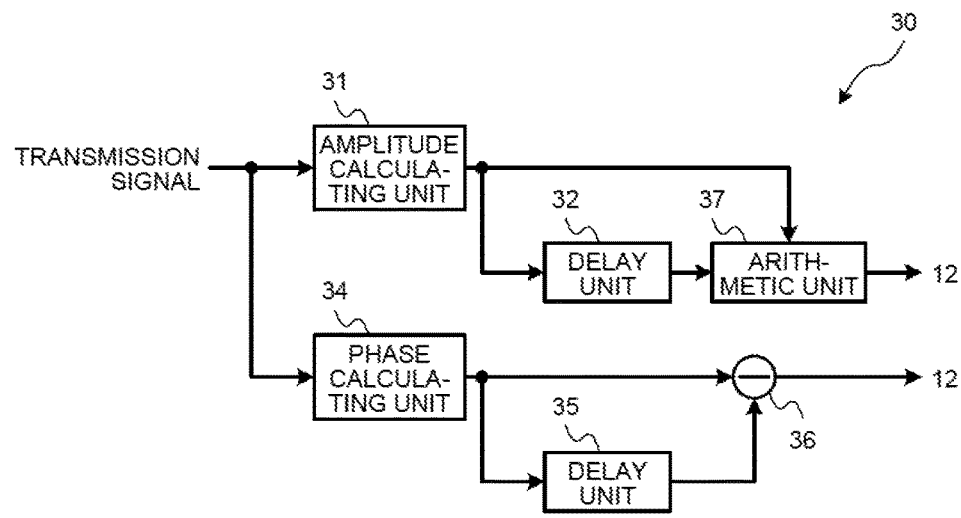
FIG. 7 is a block diagram illustrating an example of an address generating unit according to a fourth embodiment.

FIG. 7 is a block diagram illustrating an example of the address generating unit 30 according to a fourth embodiment. The address generating unit 30 according to the embodiment includes the amplitude calculating unit 31, the delay unit 32, the phase calculating unit 34, the delay unit 35, the subtracter 36, and an arithmetic unit 37. Furthermore, the blocks illustrated in FIG. 7 having the same reference numerals as those illustrated in FIG. 1 have the same configuration as the blocks illustrated in FIG. 1 except for the following points described below; therefore, descriptions thereof will be omitted.

The arithmetic unit 37 calculates the ratio of the amplitude |x(t)| of the transmission signal calculated by the amplitude calculating unit 31 to the amplitude |x(t−Δt)| of the transmission signal delayed by the delay unit 32. Specifically, the arithmetic unit 37 calculates the amplitude ratio of |x(t)|/|x(t−Δt)| by dividing the amplitude |x(t)| calculated by the amplitude calculating unit 31 by the amplitude |x(t−Δt)| delayed by the delay unit 32. Then, the arithmetic unit 37 outputs the value of the calculated amplitude ratio |x(t)|/|x(t−Δt)| to the LUT 12 as the first address. The arithmetic unit 37 is an example of the first calculating unit.

In the LUT 12 according to the fourth embodiment, for example, as illustrated in FIG. 2, K distortion compensation coefficients 125 are associated with the first addresses 120 and the second addresses 121 and are stored. The LUT 12 specifies the distortion compensation coefficients $a_1$ to $a_K$ associated with the first address and the second address output from the address generating unit 30 and then outputs the specified distortion compensation coefficients to both the distortion compensation unit 40 and the updating unit 23.

The distortion compensation unit 40 according to the fourth embodiment performs, by using the distortion compensation coefficients $a_1$ to $a_K$ output from the LUT 12 and Equation (2) above, the predistortion process on the transmission signals and generates the PD signals z(t). Then, the distortion compensation unit 40 outputs the generated PD signals z(t) to the DAC 13. Furthermore, the coefficient $a_k(f(t))$ in Equation (2) above is, in the fourth embodiment, the $k^{th}$ distortion compensation coefficient determined by the value of the function f(t) indicated in Equation (7) below and is, as illustrated in FIG. 2, associated with the first address and the second address and is stored in the LUT 12.

$$f(t) = \left( \frac{|x(t)|}{|x(t-\Delta t)|}, \Delta\theta(t) \right) \quad (7)$$

As is clear from the description above, in the distortion compensation device 10 according to the fourth embodiment, the arithmetic unit 37 calculates the ratio of the amplitudes of the transmission signals at two different times. Furthermore, the subtracter 36 calculates the phase difference between the transmission signals at the subject two different times. Then, the LUT 12 specifies the distortion compensation coefficient by using both the ratio calculated by the arithmetic unit 37 and the phase difference calculated by the subtracter 36. Then, the distortion compensation unit 40 performs, by using the distortion compensation coefficient specified by the LUT 12, the predistortion process on the transmission signal that is input to the amplifier 16. Consequently, when the distortion compensation device 10 according to the fourth embodiment compensates the distortion on the basis of a change in the phase of the transmission signal, the distortion compensation device 10 can use a different distortion compensation coefficient in accordance with a change in the amplitudes of the transmission signals. Thus, the distortion compensation device 10 according to the fourth embodiment can improve the distortion compensation performance.

[e] Fifth Embodiment

In the distortion compensation device 10 according to a fifth embodiment, the distortion compensation coefficients stored in the LUT 12 is different from the distortion compensation coefficients in the LUT 12 according to the fourth embodiment. Furthermore, the distortion compensation device 10 according to the fifth embodiment is different from the distortion compensation device 10 according to the fourth embodiment in that the PD signal z(t) is generated by multiplying the distortion compensation coefficient output from the LUT 12 by the transmission signal. Furthermore, the overall configuration of the distortion compensation device 10 according to the fifth embodiment is the same as that of the distortion compensation device 10 according to the second embodiment described with reference to FIG. 4 except for the address generating unit 30; therefore, overlapped descriptions will be omitted.

Figure 8:
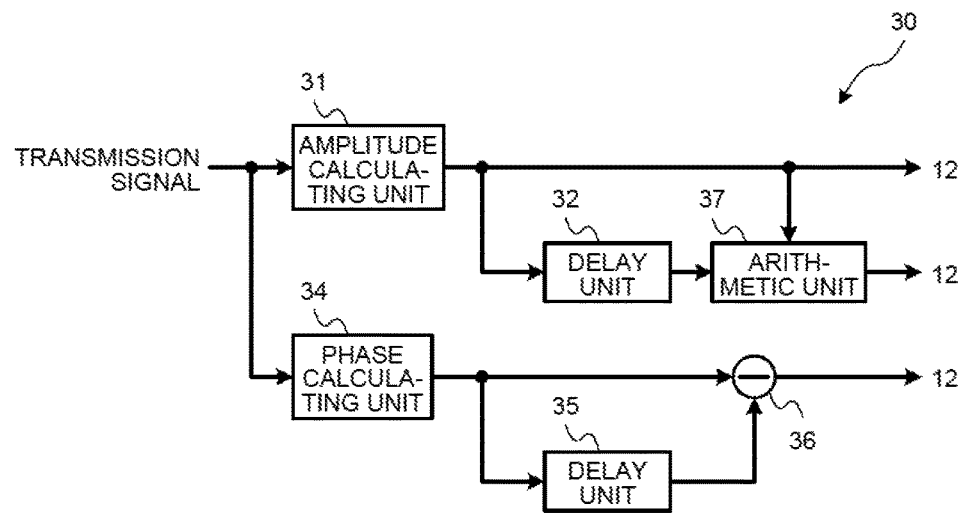
FIG. 8 is a block diagram illustrating an example of an address generating unit according to a fifth embodiment.

FIG. 8 is a block diagram illustrating an example of the address generating unit 30 according to a fifth embodiment. The address generating unit 30 according to the embodiment includes the amplitude calculating unit 31, the delay unit 32, the phase calculating unit 34, the delay unit 35, the subtracter 36, and the arithmetic unit 37. Furthermore, the blocks illustrated in FIG. 8 having the same reference numerals as those illustrated in FIG. 7 have the same configuration as the blocks illustrated in FIG. 7 except for the following points described below; therefore, descriptions thereof will be omitted.

The amplitude calculating unit 31 calculates the amplitude |x(t)| of the transmission signal at the first time and outputs the value of the calculated amplitude |x(t)| to both the delay unit 32 and the arithmetic unit 37. Furthermore, the amplitude calculating unit 31 outputs the value of the calculated amplitude |x(t)| to the LUT 12 as the third address.

In the LUT 12 according to the fifth embodiment, for example, as illustrated in FIG. 5, the distortion compensation coefficients 126 are associated with the first addresses 120, the second addresses 121, and the third addresses 122 and are stored. The LUT 12 specifies the distortion compensation coefficient C that is associated with the first address, the second address, and the third address output from the address generating unit 30 and outputs the specified distortion compensation coefficient to both the multiplier 11 and the updating unit 23.

The distortion compensation coefficients C associated with the first addresses 120, the second addresses 121, and the third addresses 122 and stored in the LUT 12 are represented by, for example, Equation (4) above. Furthermore, the function f(t) in Equation (4) above can be represented by, in the fifth embodiment, for example, Equation (8) below.

$$f(t) = \left( |x(t)|, \frac{|x(t)|}{|x(t-\Delta t)|}, \Delta\theta(t) \right) \quad (8)$$

In Equation (8) above, "|x(t)|/|x(t−Δt)|" represents the first address calculated by the address generating unit 30 and "Δθ(t)" represents the second address calculated by the address generating unit 30. Furthermore, in Equation (8) above, "|x(t)|" represents the third address calculated by the address generating unit 30. Furthermore, in the fifth embodiment, $a_k(f(t))$ in Equation (4) above is the $k^{th}$ coefficient determined by the value of Equation (8) above.

The multiplier 11 according to the fifth embodiment performs, by using the distortion compensation coefficient C output form the LUT 12, the predistortion process on the transmission signal that is input to the amplifier 16. Specifically, the multiplier 11 performs the predistortion process on the transmission signal x(t) by multiplying the distortion compensation coefficient C that is output from the LUT 12 by the transmission signal x(t). Consequently, the multiplier 11 generates the PD signal z(t) represented by Equation (2) above.

As described above, the distortion compensation device 10 according to the fifth embodiment stores, in the LUT 12, the distortion compensation coefficients indicated by Equations (4) and (8) above and specifies the distortion compensation coefficient on the basis of the amplitude |x(t)|, the amplitude ratio |x(t)|/|x(t−Δt)|, and the phase difference Δθ(t) of the transmission signals. Then, the distortion compensation device 10 according to the fifth embodiment performs the predistortion process by multiplying the specified distortion compensation coefficient by the transmission signal. Consequently, the distortion compensation device 10 according to the fifth embodiment can generate the PD signal z(t) by an amount of computation smaller than that used in the distortion compensation device 10 according to the fourth embodiment.

[f] Sixth Embodiment

The distortion compensation device 10 according to a sixth embodiment differs from the distortion compensation device 10 according to the first embodiment in that a distortion compensation coefficient is specified on the basis of the result of multiplying the product of the amplitudes of transmission signals at two different times by a phase difference between the transmission signals at the subject two different times. Furthermore, the overall configuration of the distortion compensation device 10 according to the sixth embodiment is the same as that of the distortion compensation device 10 according to the first embodiment described with reference to FIG. 1 except for the address generating unit 30; therefore, overlapped descriptions thereof will be omitted.

Figure 9:
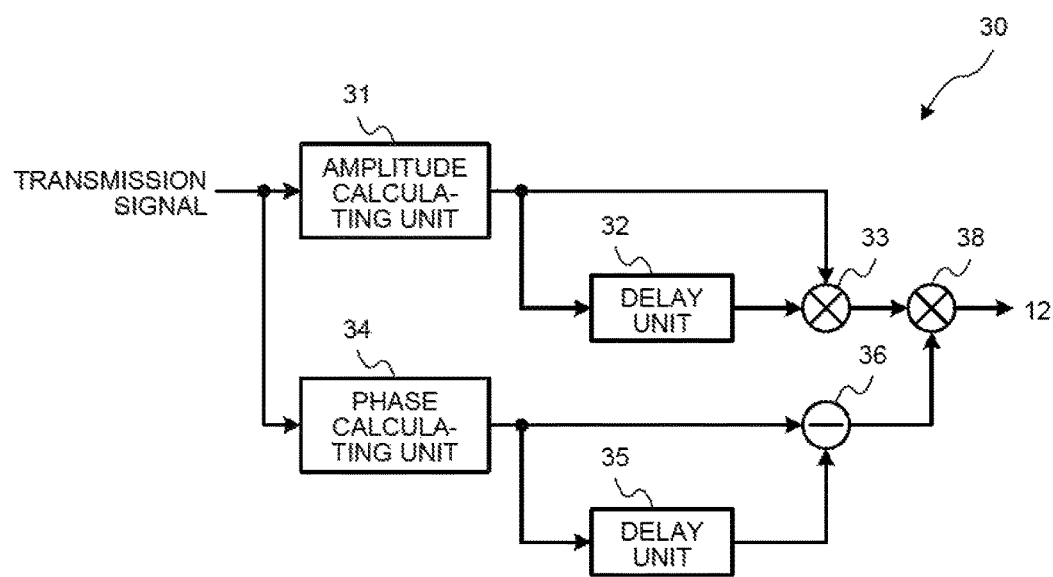
FIG. 9 is a block diagram illustrating an example of an address generating unit according to a sixth embodiment.

FIG. 9 is a block diagram illustrating an example of the address generating unit 30 according to a sixth embodiment. The address generating unit 30 according to the sixth embodiment includes the amplitude calculating unit 31, the delay unit 32, the multiplier 33, the phase calculating unit 34, the delay unit 35, the subtracter 36, and a multiplier 38. Furthermore, the blocks illustrated in FIG. 9 having the same reference numerals as those illustrated in FIG. 1 have the same configuration as the blocks illustrated in FIG. 1 except for the following points described below; therefore, descriptions thereof will be omitted.

The multiplier 38 multiplies the value of the amplitude product |x(t)||x(t−Δt)| calculated by the multiplier 33 by the value of the phase difference Δθ(t) calculated by the subtracter 36. Then, the multiplier 38 outputs the value of the multiplication result |x(t)||x(t−Δt)|Δθ(t) to the LUT 12 as the first address.

Figure 10:
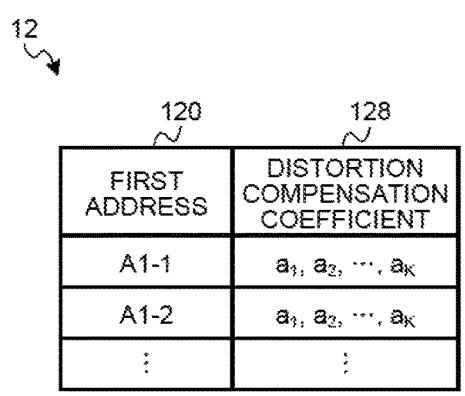
FIG. 10 is a schematic diagram illustrating an example of distortion compensation coefficients stored in an LUT according to the sixth embodiment.

FIG. 10 is a schematic diagram illustrating an example of distortion compensation coefficients stored in the LUT 12 according to the sixth embodiment. In the LUT 12 according to the sixth embodiment, for example, as illustrated in FIG. 10, K distortion compensation coefficients 128 are associated with the first addresses 120 and are stored. The LUT 12 specifies the address generating unit 30 specifies the distortion compensation coefficients $a_1$ to $a_K$ associated with the first addresses and outputs the specified distortion compensation coefficients to both the distortion compensation unit 40 and the updating unit 23.

The distortion compensation unit 40 according to the sixth embodiment performs, by using the distortion compensation coefficients $a_1$ to $a_K$ output form the LUT 12 and Equation (2) above, the predistortion process on the transmission signals and generates the PD signals z(t). Then, the distortion compensation unit 40 outputs the generated PD signal z(t) to the DAC 13. The coefficient $a_k(f(t))$ in Equation (2) above is, in the sixth embodiment, the $k^{th}$ distortion compensation coefficient determined by the value of Equation (9) below and is, as illustrated in FIG. 10, associated with the first address and stored in the LUT 12.

$$f(t)=|x(t)||x(t-\Delta t)|\Delta\theta(t) \quad (9)$$

As is clear from the description above, in the distortion compensation device 10 according to the sixth embodiment, the multiplier 38 multiplies the product of the amplitudes of the transmission signals at two different times by the phase difference between the transmission signals at the subject two different times. Then, the LUT 12 specifies the distortion compensation coefficient by using the multiplication result calculated by the multiplier 38. Consequently, the distortion compensation device 10 can reduce the number of addresses allocated to the respective distortion compensation coefficients and reduce the size of the LUT 12. Thus, the distortion compensation device 10 can improve the distortion compensation performance and can reduce the size of the circuit in the distortion compensation device 10.

[g] Seventh Embodiment

In the distortion compensation device 10 according to a seventh embodiment, the distortion compensation coefficients stored in the LUT 12 are different from the distortion compensation coefficients stored in the LUT 12 according to the sixth embodiment. Furthermore, the distortion compensation device 10 according to the seventh embodiment differs from the distortion compensation device 10 according to the sixth embodiment in that the PD signal z(t) is generated by multiplying the distortion compensation coefficient output from the LUT 12 by the transmission signal. Furthermore, the overall configuration of the distortion compensation device 10 according to the seventh embodiment is the same as that of the distortion compensation device 10 according to the second embodiment described with reference to FIG. 4 except for the address generating unit 30; therefore, overlapped descriptions will be omitted.

Figures 11, 12:
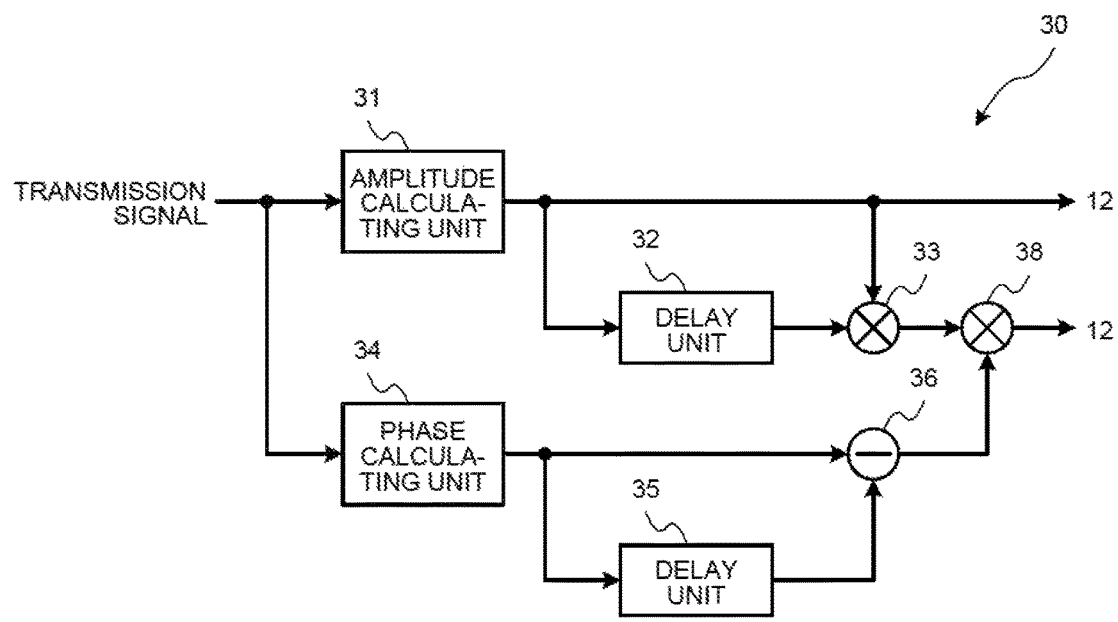
FIG. 11 is a block diagram illustrating an example of an address generating unit according to a seventh embodiment.
FIG. 12 is a schematic diagram illustrating an example of distortion compensation coefficients stored in an LUT according to the seventh embodiment.

FIG. 11 is a block diagram illustrating an example of the address generating unit 30 according to the seventh embodiment. The address generating unit 30 according to the seventh embodiment includes the amplitude calculating unit 31, the delay unit 32, the multiplier 33, the phase calculating unit 34, the delay unit 35, the subtracter 36, and the multiplier 38. Furthermore, the blocks illustrated in FIG. 11 having the same reference numerals as those illustrated in FIG. 9 have the same configuration as the blocks illustrated in FIG. 9 except for the following points described below; therefore, descriptions thereof will be omitted.

The amplitude calculating unit 31 calculates the amplitude |x(t)| of the transmission signal at the first time and outputs the value of the calculated amplitude |x(t)| to both the delay unit 32 and the multiplier 33. Furthermore, the amplitude calculating unit 31 outputs the value of the calculated amplitude |x(t)| to the LUT 12 as the second address.

FIG. 12 is a schematic diagram illustrating an example of distortion compensation coefficients stored in the LUT 12 according to the seventh embodiment. In the LUT 12 according to the seventh embodiment, for example, as illustrated in FIG. 12, the distortion compensation coefficients 129 are associated with the first addresses 120 and the second addresses 121 and are stored. The LUT 12 specifies the distortion compensation coefficient C associated with the first address and the second address output from the address generating unit 30 and outputs the specified distortion compensation coefficient C to both the multiplier 11 and the updating unit 23.

The distortion compensation coefficients C that are associated with the first address 120 and the second address 121 and that are stored in the LUT 12 are represented by, for example, Equation (4) above. Furthermore, the function f(t)

in Equation (4) above is represented by, for example, in the seventh embodiment, Equation (10) below.

$$f(t)=(|x(t)|,|x(t)||x(t-\Delta t)|\Delta \theta(t)) \quad (10)$$

In Equation (10), "$|x(t)||x(t-\Delta t)|\Delta \theta(t)$" is the first address calculated by the address generating unit 30 and "$|x(t)|$" is the second address calculated by the address generating unit 30. Furthermore, in the seventh embodiment, $a_k(f(t))$ in Equation (4) above represents the $k^{th}$ coefficient determined by the value of the function f(t) represented in Equation (10) above.

The multiplier 11 according to the seventh embodiment performs, by using the distortion compensation coefficient C output from the LUT 12, the predistortion process on the transmission signal that is input to the amplifier 16. Specifically, the multiplier 11 performs the predistortion process on the transmission signal x(t) by multiplying the distortion compensation coefficient C output from the LUT 12 by the transmission signal x(t). Consequently, the multiplier 11 generates the PD signal z(t) represented by Equation (2) above.

In this way, the distortion compensation device 10 according to the seventh embodiment stores, in the LUT 12, the distortion compensation coefficients represented by Equations (4) and (10) above and specifies the distortion compensation coefficient C on the basis of both the amplitude $|x(t)|$ of the transmission signal and the multiplication result $|x(t)||x(t-\Delta t)|\Delta \theta(t)$. Then, the distortion compensation device 10 according to the seventh embodiment performs the predistortion process by multiplying the specified distortion compensation coefficient C by the transmission signal. Consequently, the distortion compensation device 10 according to the seventh embodiment can generate the PD signal z(t) by an amount of computation smaller than that used in the distortion compensation device 10 according to the sixth embodiment.

[h] Eighth Embodiment

The distortion compensation device 10 according to an eighth embodiment calculates the inner product of the vector of the transmission signals at two different times and the outer product of the vector of the transmission signals at the subject two different times. Then, the distortion compensation device 10 according to the eighth embodiment differs from the distortion compensation device 10 according to the first embodiment in that the distortion compensation coefficient is specified on the basis of the value of the inner product that is obtained by replacing the sign of the calculated inner product is replaced with the sign of the calculated outer product. Furthermore, the overall configuration of the distortion compensation device 10 according to the eighth embodiment is the same as that of the distortion compensation device 10 according to the first embodiment described with reference to FIG. 1 except for the address generating unit 30; therefore, overlapped descriptions will be omitted.

Figure 13:
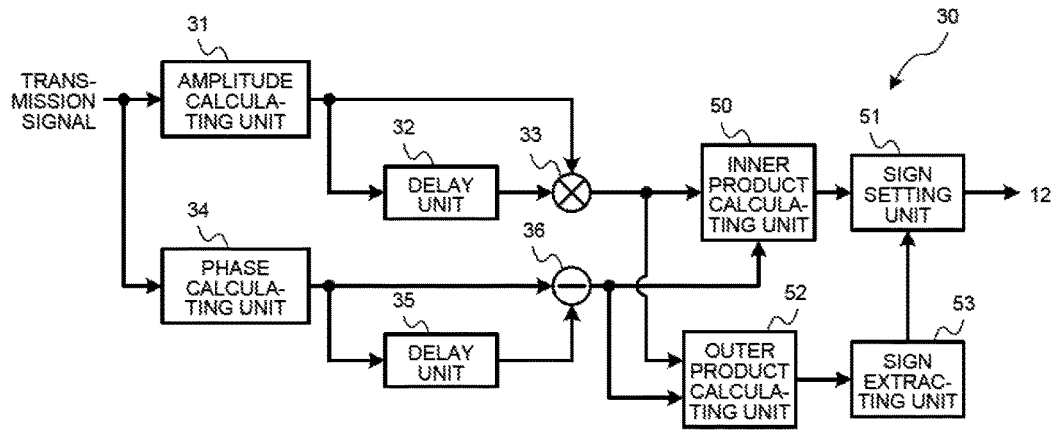
FIG. 13 is a block diagram illustrating an example of an address generating unit according to an eighth embodiment.

FIG. 13 is a block diagram illustrating an example of the address generating unit 30 according to the eighth embodiment. The address generating unit 30 according to the embodiment includes the amplitude calculating unit 31, the delay unit 32, the multiplier 33, the phase calculating unit 34, the delay unit 35, the subtracter 36, an inner product calculating unit 50, a sign setting unit 51, an outer product calculating unit 52, and a sign extracting unit 53. Furthermore, the blocks illustrated in FIG. 13 having the same reference numerals as those illustrated in FIG. 1 have the same configuration as the blocks illustrated in FIG. 1 except for the following points described below; therefore, descriptions thereof will be omitted.

The inner product calculating unit 50 calculates the inner product of the vector of the transmission signal x(t) and the vector of the delayed transmission signal x(t−Δt). Specifically, the inner product calculating unit 50 calculates the inner product $|x(t)||x(t-\Delta t)|\cos \Delta \theta(t)$ by using the value of the amplitude product $|x(t)||x(t-\Delta t)|$ calculated by the multiplier 33 and by using the value of the phase difference Δθ(t) calculated by the subtracter 36.

The outer product calculating unit 52 calculates the outer product of the vector of the transmission signal x(t) and the vector of the delayed transmission signal x(t−Δt). Specifically, the outer product calculating unit 52 calculates the outer product $|x(t)||x(t-\Delta t)|\sin \Delta \theta(t)$ by using the value of the amplitude product $|x(t)||x(t-\Delta t)|$ calculated by the multiplier 33 and the phase difference Δθ(t) calculated by the subtracter 36.

The sign extracting unit 53 extracts the sign of the value of the outer product calculated by the outer product calculating unit 52. The sign setting unit 51 sets the sign extracted by the sign extracting unit 53 to the sign of the value of the inner product calculated by the inner product calculating unit 50. Then, the sign setting unit 51 outputs the value of the inner product in which the sign is set to the LUT 12 as the first address.

In the LUT 12 according to the eighth embodiment, for example, as illustrated in FIG. 10, K distortion compensation coefficients 128 are associated with the first addresses 120 and stored. The LUT 12 specifies the distortion compensation coefficients $a_1$ to $a_K$ associated with the first addresses output from the address generating unit 30 and outputs the specified distortion compensation coefficients to both the distortion compensation unit 40 and the updating unit 23.

The distortion compensation unit 40 according to the eighth embodiment performs, by using the distortion compensation coefficients $a_1$ to $a_K$ output from the LUT 12 and by using Equation (2) above, the predistortion process on the transmission signal and generates the PD signals z(t). Then, the distortion compensation unit 40 outputs the generated PD signals z(t) to the DAC 13. Furthermore, the coefficient $a_k(f(t))$ in Equation (2) above is, in the eighth embodiment, the $k^{th}$ distortion compensation coefficient determined by the value of the function f(t) indicated by Equation (11) below and is, as illustrated in FIG. 10, associated with the first address and stored in the LUT 12.

$$f(t)=\text{sgn}\{x(t)\times x(t-\Delta t)\}\{x(t)\cdot x(t-\Delta t)\} \quad (11)$$

In Equation (11) above, "sgn{x(t)×x(t−Δt)}" is the function for extracting the sign of "x(t)×x(t−Δt)". Furthermore, "x(t)×x(t−Δt)" represents the outer product of the vector of "x(t)" and the vector of "x(t−Δt)". Furthermore, "x(t)·x(t−Δt)" represents the inner product of the vector of "x(t)" and the vector of "x(t−Δt)".

As is clear from the description above, in the distortion compensation device 10 according to the eighth embodiment, the address generating unit 30 calculates the inner product and the outer product of the vectors of the transmission signals at two different times and calculates, as the first address, the value obtained by replacing the sign of the inner product with the sign of the outer product. Then, the LUT 12 specifies the distortion compensation coefficients on the basis of the first addresses calculated by the address generating unit 30. Consequently, the distortion compensation device 10 can reduce the number of addresses allocated to each of the distortion compensation coefficients and thus reduce the size of the LUT 12. Thus, the distortion compensation device 10 can improve the distortion compensation performance and can reduce the size of the circuit in the distortion compensation device 10.

[i] Ninth Embodiment

In the distortion compensation device 10 according to a ninth embodiment, the distortion compensation coefficients stored in the LUT 12 are different from the distortion compensation coefficients stored in the LUT 12 according to the eighth embodiment. Furthermore, the distortion compensation device 10 according to the ninth embodiment differs from the distortion compensation device 10 according to the eighth embodiment in that the PD signal z(t) is generated by multiplying the distortion compensation coefficient output from the LUT 12 by the transmission signal. Furthermore, the overall configuration of the distortion compensation device 10 according to the ninth embodiment is the same as that of the distortion compensation device 10 according to the second embodiment described with reference to FIG. 4 except for the address generating unit 30; therefore, overlapped descriptions thereof will be omitted.

Figure 14:
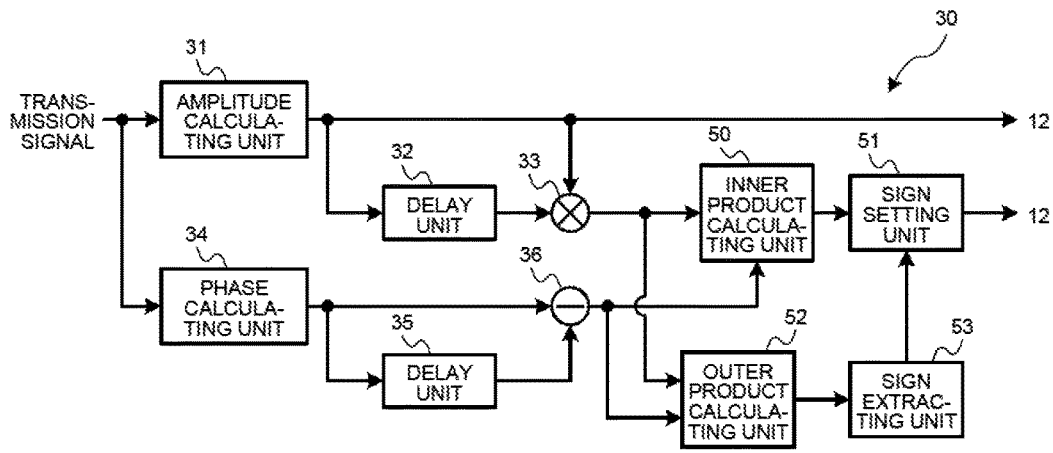
FIG. 14 is a block diagram illustrating an example of an address generating unit according to a ninth embodiment.

FIG. 14 is a block diagram illustrating an example of the address generating unit 30 according to a ninth embodiment. The address generating unit 30 according to the ninth embodiment includes the amplitude calculating unit 31, the delay unit 32, the multiplier 33, the phase calculating unit 34, the delay unit 35, the subtracter 36, the inner product calculating unit 50, the sign setting unit 51, the outer product calculating unit 52, and the sign extracting unit 53. Furthermore, the blocks illustrated in FIG. 14 having the same reference numerals as those illustrated in FIG. 13 have the same configuration as the blocks illustrated in FIG. 13 except for the following points described below; therefore, descriptions thereof will be omitted.

The amplitude calculating unit 31 calculates the amplitude |x(t)| of the transmission signal at the first time and outputs the value of the calculated amplitude |x(t)| to both the delay unit 32 and the multiplier 33. Furthermore, the amplitude calculating unit 31 outputs the value of the calculated amplitude |x(t)| to the LUT 12 as the second address.

In the LUT 12 according to the ninth embodiment, for example, as illustrated in FIG. 12, the distortion compensation coefficients 129 are associated with the first addresses 120 and the second addresses 121 and are stored. The LUT 12 specifies the distortion compensation coefficient C that is associated with the first address and the second address that are output from the address generating unit 30 and then outputs the specified distortion compensation coefficient to both the multiplier 11 and the updating unit 23.

The distortion compensation coefficients C that are stored in the LUT 12 and that are associated with the first addresses 120 and the second addresses 121 are represented by, for example, Equation (4) above. Furthermore, the function f(t) in Equation (4) above is represented by, in the ninth embodiment, for example, Equation (12) below.

$$f(t)=(|x(t)|,\text{sgn}\{x(t)\times x(t-\Delta t)\}\{x(t)\cdot x(t-\Delta t)\}) \quad (12)$$

In Equation (12) above, "sgn$\{x(t)\times x(t-\Delta t)\}\{x(t)\cdot x(t-\Delta t)\}$" is the first address calculated by the address generating unit 30 and "|x(t)|" is the second address calculated by the address generating unit 30. Furthermore, in the ninth embodiment, $a_k(f(t))$ in Equation (4) above is the $k^{th}$ coefficient determined by the value of the function f(t) represented in Equation (12) above.

The multiplier 11 according to the ninth embodiment performs, by using the distortion compensation coefficient C output form the LUT 12, the predistortion process on the transmission signal that is input to the amplifier 16. Specifically, the multiplier 11 performs the predistortion process on the transmission signal x(t) by multiplying the distortion compensation coefficient C output from the LUT 12 by the transmission signal x(t). Consequently, the multiplier 11 generates the PD signal z(t) represented by Equation (2) above.

In this way, the distortion compensation device 10 according to the ninth embodiment stores, in the LUT 12, the distortion compensation coefficients represented by Equations (4) and (12) above. Then, the distortion compensation device 10 according to the ninth embodiment specifies the distortion compensation coefficient C on the basis of the amplitude |x(t)| of the transmission signal and the arithmetic result of sgn$\{x(t)\times x(t-\Delta t)\}\{x(t)\cdot x(t-\Delta t)\}$. Then, the distortion compensation device 10 according to the ninth embodiment performs the predistortion process by multiplying the specified distortion compensation coefficient C by the transmission signal. Consequently, the distortion compensation device 10 according to the ninth embodiment can generate the PD signal z(t) by an amount of computation smaller than that used in the distortion compensation device 10 according to the eighth embodiment.

Hardware

Figure 15:
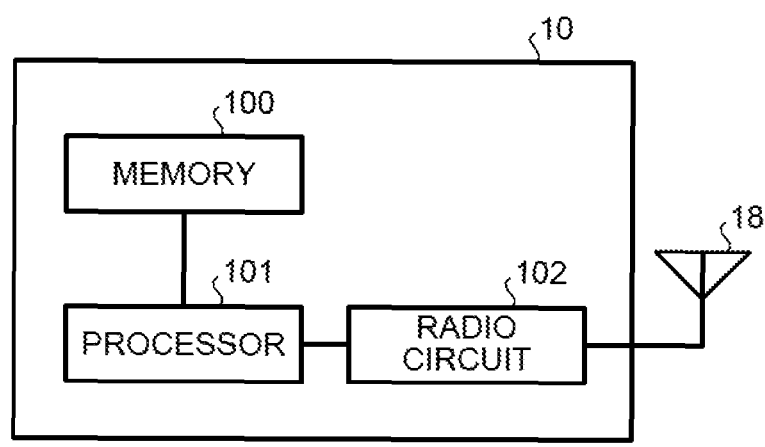
FIG. 15 is a block diagram illustrating an example of hardware of the distortion compensation device.
Figure 16:
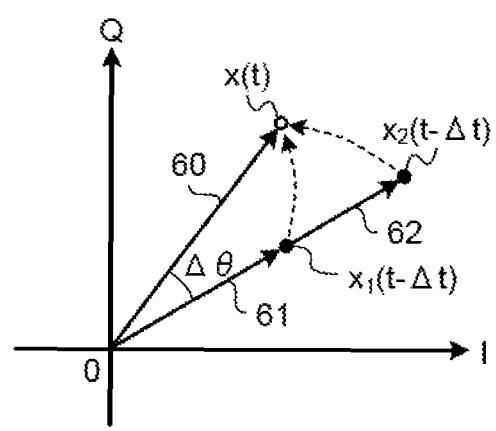
FIG. 16 is a schematic diagram illustrating the shift of sample points of a transmission signal.

In the following, the hardware of the distortion compensation device 10 described in the first to the ninth embodiments will be described. FIG. 15 is a block diagram illustrating an example of the hardware of the distortion compensation device 10. The distortion compensation device 10 includes, for example, as illustrated in FIG. 15, a memory 100, a processor 101, a radio circuit 102, and the antenna 18.

The radio circuit 102 performs the process, such as up conversion or the like, on the signal that is output from the processor 101 and then sends the processed signal via the antenna 18. The radio circuit 102 includes the amplifier 16. The radio circuit 102 performs the process, such as down conversion or the like, on a part of the signal that is output from the amplifier 16 and feeds back the processed signal to the processor 101. The radio circuit 102 implements the function of, for example, the DAC 13, the up converter 14, the oscillator 15, the amplifier 16, the coupler 17, the down converter 19, and the ADC 20.

In the first, the third, the fourth, the sixth, and the eighth embodiments, the memory 100 stores therein various kinds of programs or the like that implement the function of, for example, the LUT 12, the subtracter 21, the complex conjugate calculating unit 22, the updating unit 23, the address generating unit 30, and the distortion compensation unit 40. In the first, the third, the fourth, the sixth, and the eighth embodiments, by executing the programs read from the memory 100, the processor 101 implements the function of, for example, the LUT 12, the subtracter 21, the complex conjugate calculating unit 22, the updating unit 23, the address generating unit 30, and the distortion compensation unit 40.

Furthermore, in the second, the fifth, the seventh, and the ninth embodiments, the memory 100 stores therein various kinds of programs or the like that implement the function of, for example, the multiplier 11, the LUT 12, the subtracter 21, the complex conjugate calculating unit 22, the updating unit 23, and the address generating unit 30. In the second, the fifth, the seventh, and the ninth embodiments, by executing the programs read from the memory 100, the processor 101 implements the function of, for example, the multiplier 11, the LUT 12, the subtracter 21, the complex conjugate calculating unit 22, the updating unit 23, and the address generating unit 30.

Furthermore, in the distortion compensation device 10 illustrated in FIG. 15, each of the memory 100, the processor 101, the radio circuit 102, and the antenna 18 are provided; however, a plurality number of the memories 100, the processors 101, the radio circuits 102, and the antennas 18 may also be provided.

Others

The technology disclosed in the present application is not limited to the embodiments described above and various modifications are possible as long as they do not depart from the spirit of the present application.

For example, in the first to the ninth embodiments described above, the address generating unit 30 calculates the product or the ratio of amplitudes of transmission signals at two different times; however, the disclosed technology is not limited to this. For example, the address generating unit 30 may also calculate the product or the ratio of power of transmission signals at two different times. In this case, in the first to the ninth embodiments described above, the amplitude |x(t)| can alternatively be read as the power p(t) and the amplitude |x(t−Δt)| can alternatively be read as the power p(t−Δt).

According to an aspect of an embodiment of the present application, it is possible to improve the distortion compensation performance while reducing an increase in the size of a circuit.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A distortion compensation device comprising:
   a first calculating unit that calculates product of amplitudes or product of power of transmission signals at two different times or that calculates ratio of amplitudes or ratio of power of transmission signals at two different times;
   a second calculating unit that calculates a phase difference between the transmission signals at the two different times;
   a specifying unit that specifies a distortion compensation coefficient by using both the product or the ratio calculated by the first calculating unit and the phase difference calculated by the second calculating unit; and
   a distortion compensation unit that performs, by using the distortion compensation coefficient specified by the specifying unit, a predistortion process on the transmission signal that is input to an amplifier.

2. The distortion compensation device according to claim 1, wherein
   the specifying unit specifies a coefficient of each of term in memory polynomial series as the distortion compensation coefficient, and
   the distortion compensation unit performs the predistortion process based on the memory polynomial series by using both the distortion compensation coefficient specified by the specifying unit and the transmission signal that is input to the amplifier.

3. The distortion compensation device according to claim 1, wherein the specifying unit specifies the distortion compensation coefficient by using result obtained by multiplying the product calculated by the first calculating unit by the phase difference calculated by the second calculating unit.

4. The distortion compensation device according to claim 1, further comprising:
   a third calculating unit that calculates inner product of vectors that indicate the transmission signals at the two different times based on both the product calculated by the first calculating unit and the phase difference calculated by the second calculating unit; and
   an extracting unit that extracts sign of outer product of the vectors that indicate the transmission signals at the two different times, wherein
   the specifying unit specifies the distortion compensation coefficient by using value of the inner product in which sign of the inner product calculated by the third calculating unit is replaced with the sign extracted by the extracting unit.

5. A distortion compensation method that is executed by a distortion compensation device, the distortion compensation method comprising:
   calculating, performed by the distortion compensation device, product of amplitudes or product of power of transmission signals at two different times or calculating, performed by the distortion compensation device, ratio of amplitudes or ratio of power of transmission signals at two different times;
   calculating, performed by the distortion compensation device, a phase difference between the transmission signals at the two different times;
   specifying, performed by the distortion compensation device, a distortion compensation coefficient by using both the calculated product or the ratio and the calculated phase difference; and
   performing, by the distortion compensation device by using the specified distortion compensation coefficient, a predistortion process on the transmission signal that is input to an amplifier.

* * * * *